R. A. Ives.
Comb.
Nº 945. Patented Sept. 25. 1838
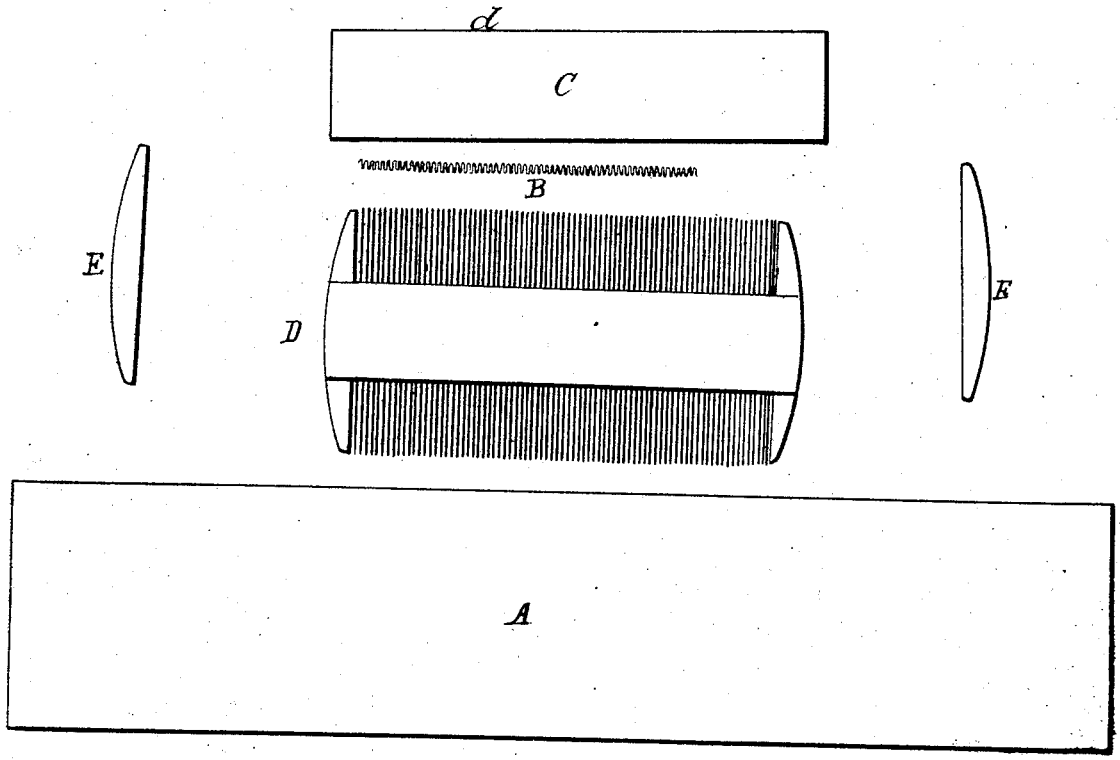

UNITED STATES PATENT OFFICE.

RICHARD A. IVES, OF BRISTOL, CONNECTICUT.

MODE OF MAKING METAL COMBS.

Specification of Letters Patent No. 945, dated September 25, 1838.

*To all whom it may concern:*

Be it known that I, RICHARD A. IVES, of Bristol, in the county of Hartford, in the State of Connecticut, have invented a new and useful Improvement in the Mode of Manufacturing Combs of Metal, of which the following is a full and exact description.

I take a piece of metal of the thickness required for the teeth and of a suitable width and length to make the comb, see A in the accompanying drawing. I then bend or double over one end of the piece wide enough for the width of a tooth, and then back again, parallel with the first and so on alternately until the whole is bent, or folded—see B. I bend or fold the piece A as near together as I can between crimpling rollers. I likewise crimple in a piece of metal of a suitable thickness to form the spaces between the teeth. They are then pressed together. The piece which forms the spaces is then drawn out. I then solder a place through the middle of a sufficient width to form the body, or bar of the comb. The piece is then ground or cut in a cutting engine, a sufficient depth on each side, to separate the teeth and back, from the edge a proper distance for the length of the tooth, see D. Guard-teeth E E are placed on each end, and a side piece C is put on each side— see D. The whole is then soldered together by means of a hot press of a suitable construction for that purpose. The teeth are brought into a proper shape by grinding, or filing, and the comb is finished by brushing and buffing in the usual manner of polishing metal.

I do not confine myself to the exact method herein described, of bending or folding, and separating the teeth, as it may be done in different ways. The comb may be made of any suitable material for that purpose, such as gold, silver, German silver, so called, etc. The teeth of a metal comb can be formed in this way, more expeditiously than in the usual way of sawing, or cutting comb teeth—Likewise much smoothed, more durable, and of any degree of fineness required.

What I claim as my invention or improvement, and desire to secure by Letters Patent in making combs of metal is—

The bending or folding a plate or plates of metal so as to form the teeth of the comb as above described.

RICHARD ALLISON IVES.

Witnesses:
   CHARLES G. IVES,
   MARY S. BRISTOL.